United States Patent
Guillemant et al.

(10) Patent No.: US 9,378,856 B2
(45) Date of Patent: Jun. 28, 2016

(54) MOBILE SYSTEM FOR INTERVENTION IN AN ATMOSPHERE OF RADIOACTIVE GAS, NOTABLY TRITIUM

(75) Inventors: Olivier Guillemant, Saint Bernard (FR); Jean-Pierre Daclin, Messigny et Vantoux (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 948 days.

(21) Appl. No.: 13/635,899

(22) PCT Filed: Mar. 22, 2011

(86) PCT No.: PCT/EP2011/054325
§ 371 (c)(1),
(2), (4) Date: Sep. 18, 2012

(87) PCT Pub. No.: WO2011/117228
PCT Pub. Date: Sep. 29, 2011

(65) Prior Publication Data
US 2013/0008314 A1    Jan. 10, 2013

(30) Foreign Application Priority Data

Mar. 23, 2010 (FR) .................................... 10 52080

(51) Int. Cl.
*G21F 7/00* (2006.01)
*G21F 7/015* (2006.01)
*G21D 1/00* (2006.01)

(52) U.S. Cl.
CPC ................ *G21F 7/015* (2013.01); *G21D 1/003* (2013.01); *Y02E 30/40* (2013.01)

(58) Field of Classification Search
CPC ............. G21F 7/015; G21F 9/02; B01D 3/34; B01D 46/0024; G21C 9/00; G01N 33/0018

USPC .................... 95/8, 12; 96/417, 164; 55/385.2; 376/123, 293

See application file for complete search history.

(56) References Cited

U.S. PATENT DOCUMENTS

| | | | | |
|---|---|---|---|---|
| 4,371,383 A | * | 2/1983 | Rost | G21F 9/02 96/164 |
| 4,433,194 A | * | 2/1984 | Symon | B01D 3/34 203/29 |
| 5,049,350 A | * | 9/1991 | Bussard | G21B 1/25 376/123 |
| 5,730,777 A | * | 3/1998 | Petersen | B25J 21/02 55/310 |

(Continued)

FOREIGN PATENT DOCUMENTS

EP            0 307 284 A1    3/1989

OTHER PUBLICATIONS

"Le Traitement de l'air dans l'Industrie Nucleaire", Brochure DELTA NEU, pp. 1-4 (Sep. 2009).

(Continued)

*Primary Examiner* — Duane Smith
*Assistant Examiner* — Minh-Chau Pham
(74) *Attorney, Agent, or Firm* — Nixon Peabody LLP; Khaled Shami

(57) ABSTRACT

A mobile system for intervention in an atmosphere of radioactive gas, notably tritium, which includes: a dynamic confinement device, including a removable confinement barrier to surround an intervention zone and a device for controlled extraction of air to keep the zone at a lower pressure than the exterior; a device for monitoring the radioactive gas concentration in the air of the zone; a device to detect and signal the exceedance of a predefined threshold by this concentration to the persons present in the zone.

7 Claims, 1 Drawing Sheet

(56) References Cited

U.S. PATENT DOCUMENTS

| | | | | |
|---|---|---|---|---|
| 6,013,119 | A | * | 1/2000 | Cecchi ............... B01D 46/0024 261/121.1 |
| 2009/0151309 | A1 | * | 6/2009 | Austin, Jr. .............. A62B 11/00 55/383 |
| 2013/0061567 | A1 | * | 3/2013 | Kawasaki ................ B01L 1/04 55/385.2 |
| 2013/0259184 | A1 | * | 10/2013 | Sato ........................ G21C 9/00 376/293 |
| 2015/0020582 | A1 | * | 1/2015 | Dickow ............. H01N 33/0018 73/114.69 |

OTHER PUBLICATIONS

Ana, G. et al., "Tritum measurement systems used in the detritiation experimental pilot plant from Rm. Valcea", Proceedings of the 9th WSEAS/IASME International Conference on Electric Power Systems, High Voltages, Electric Machines, pp. 46-50 (2009).

Leterq, D. et al., "Retour d/experience du procede de detritiation de Valduc", CEA, SFRP—Journees Tritium, pp. 1-22 (Sep. 23-24, 2009).

Rizzello, Claudio et al., "Review of tritium confinement and atmosphere detritiation system in hot cells complex", Fusion Engineering and Design, vol. 85, pp. 58-63 (Jan. 2010).

International Search Report and International Written Opinion, PCT/EP2011/054325, dated Jun. 22, 2011.

French Preliminary Search Report, FR 1052080, dated Nov. 10, 2010.

"Memento de la radioprotection n exploitation", EDF, 2004, p. 123, http://www.pompiers-risquestechno.fr/images/stories/rad/mementorp.pdf.

European Examination Report in European Application No. 11 710 183.2, dated Sep. 26, 2014.

\* cited by examiner

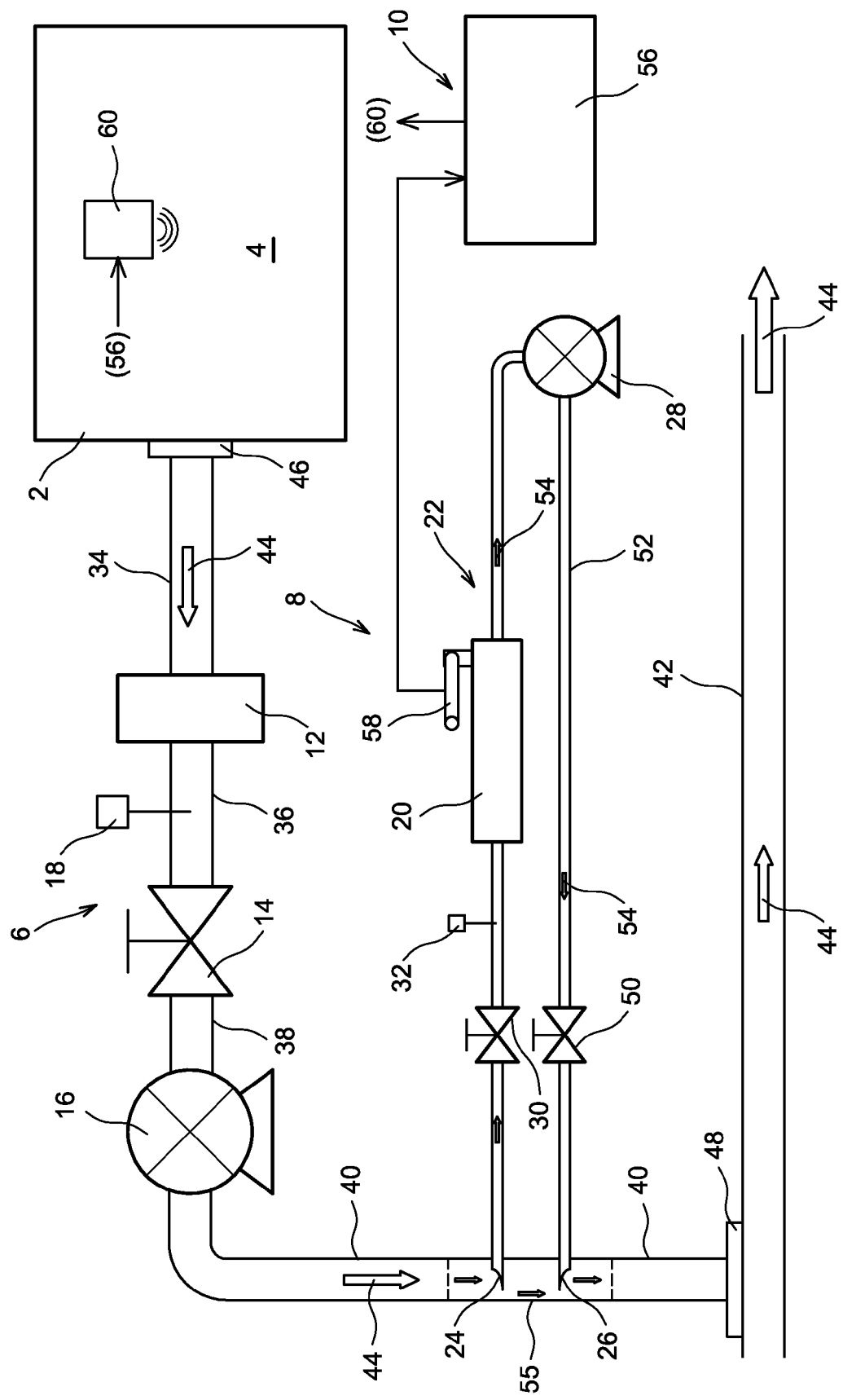

MOBILE SYSTEM FOR INTERVENTION IN AN ATMOSPHERE OF RADIOACTIVE GAS, NOTABLY TRITIUM

CROSS REFERENCE TO RELATED APPLICATIONS OR PRIORITY CLAIM

This application is a National Phase of PCT/EP2011/054325, filed Mar. 22, 2011, entitled, "MOBILE SYSTEM FOR INTERVENTION IN AN ATMOSPHERE OF RADIOACTIVE GAS, NOTABLY TRITIUM", which claims the benefit of French Patent Application No. 10 52080, filed Mar. 23, 2010, the contents of which are incorporated herein by reference in their entirety.

TECHNICAL FIELD

The present invention concerns a mobile system for intervention in an atmosphere of radioactive gas, notably tritium.

It applies in particular to maintenance and sanitation interventions in a tritium atmosphere.

Interventions on confinement barriers, which are used in installations handling tritium, carry a high risk of dissemination of this radioelement, and of contamination of persons undertaking the intervention. Tritium is, indeed, very volatile.

It is therefore necessary to install individual and collective protections for these persons, in order to minimise risks of external exposure.

A removable barrier is generally installed in order partially to reconstitute a static confinement function. This removable barrier is a solid wall consisting of plastic films or easy-assembly assembled elements.

The system forming the object of the invention completes this removable barrier, adding to it a function for controlled extraction of the air contained in the intervention zone, which may contain radioactive gas, whilst keeping the intervention zone at a slightly lower pressure than the exterior of this zone.

This controlled extraction function, with the maintenance of a slightly lower pressure, is commonly called dynamic confinement.

This dynamic confinement, associated with the installed barrier, creates a pressure gradient which favours transfer of the tritium in a particular direction. The tritium is then generally evacuated from the intervention zone to a ventilation pipe which forms part of the installation where the intervention zone is located.

During an intervention, the optimum conditions for nominal operation of the installation are reconstituted.

It should be stated immediately that the present intervention combines, with the dynamic confinement function, various items of equipment which enable not only monitoring of the intervention conditions, but also detection of the failure of an element. Operators who undertake the intervention are thus notified, in situ, of any deterioration of the conditions in which they are accomplishing this intervention.

STATE OF THE PRIOR ART

Certain maintenance or dismantlement operations require that the confinement function of installations where tritium is handled is degraded.

These operations consist, for example, in opening sealed enclosures, or portions of pipes or containers.

They are undertaken in an atmosphere where radioactive atmospheric contamination may be substantial, notably when the installation of a protection against dust dissemination is installed in the intervention zone. Consequently these operations can rapidly become disadvantageous for the operators, in terms of dosimetry.

An intervention is generally undertaken in a ventilated room, the atmosphere of which is monitored in order to determine its tritium content. However, the zone in which tritium is discharged into the air can be very localized, or even point-like; in addition, dilution in the atmosphere of the room and detection of the activity which is due to tritium are not immediate and can lead to contamination of the operator undertaking the intervention, by inhalation or percutaneous transfer.

In order to prevent surface contamination of rooms or facilities by extremely fine dusts with a very high tritium specific activity, removable protection is almost always installed in the location of an operation. This in situ protection prevents the tritium from being diluted by diffusion, and detected by permanent devices fitted in the rooms.

On the other hand, dynamic confinement devices and also monitoring and signalling devices are commercially available, but these have no real consistency between them. In addition, these commercially available devices do not have an intrinsic safety function.

DESCRIPTION OF THE INVENTION

One aim of the present invention is to remedy these disadvantages. It concerns a modular and independent system, enabling optimum safety of the operators to be guaranteed during operations to deconfine tritiated circuits or waste.

According to a preferred embodiment, this system provides the following functions in a consistent manner: a ventilation function by means of an independent ventilator, a function for permanent measurement of the volume activity of the tritium by means of an ionisation chamber, and an acoustic and visual signalling function, which is positioned remotely in the intervention zone.

The independent ventilator is fitted with a device for filtering and adjusting the flow rate using a damper; the discharge of the ventilator can be connected to the general ventilation network of the room where the system is installed, by means of appropriate devices; the extraction flow rate is continuously measured, and configurable thresholds are monitored.

The ionisation chamber is fitted with a device of the Venturi type in order to extract gaseous samples from the ventilation flow, and with a device to check continuously the validity of the measurement by monitoring the flow rate; in addition, the recording of the measured variables and the digital processing thereof are carried out.

Knowledge of the tritium concentration over time enables the dose absorbed by each operator undertaking the intervention to be known.

In precise terms, the object of the present invention is a system for intervention in a radioactive gas atmosphere, notably a tritium atmosphere, where the system is characterised in that it includes:

a dynamic confinement device including:
a removable confinement barrier, able to surround an intervention zone, and
a controlled air extraction device, able to keep the intervention zone at a lower pressure than the exterior of this zone,
a monitoring device, to monitor the radioactive gas concentration in the air of the intervention zone, and
a detection and signalling device, to detect an exceedance of a predefined threshold by this concentration, and to signal the exceedance to the person or persons present in the intervention zone.

According to a preferred embodiment of the system forming the object of the invention, the controlled air extraction device includes:

a filtration device, to filter any dust in the air extracted from the intervention zone, an adjustment device, to adjust the flow rate of the air which is extracted, and a ventilation device.

The system preferably also includes a device for measuring the flow rate of the air which is extracted.

According to a preferred embodiment of the invention, the monitoring device includes a device for measuring the volume activity of the radioactive gas.

The device for measuring the volume activity of the radioactive gas preferably includes:

an ionisation chamber, and a device to cause samples of the extracted air to flow in the ionisation chamber.

The device to cause the samples to flow in the ionisation chamber preferably includes:

a first device of the Venturi type to extract the samples, and a second device of the Venturi type to restore the extracted samples.

This device preferably also includes:

a turbine to increase the flow of the samples in the ionisation chamber, and a device to adjust the flow rate of the extracted samples.

The system forming the object of the invention preferably also includes a device for measuring the air flow rate in the ionisation chamber.

BRIEF DESCRIPTION OF THE ILLUSTRATIONS

The present invention will be better understood on reading the description of example embodiments given below, purely as an indication, and in no way restrictively, making reference to the single appended FIGURE, which is a schematic view of a particular embodiment of the system forming the object of the invention.

DETAILED ACCOUNT OF PARTICULAR EMBODIMENTS

The example of the invention, which is illustrated schematically by the appended FIGURE, is a system for intervention in a tritium atmosphere.

This system includes a dynamic confinement device including:

a removable confinement barrier 2, able to surround an intervention zone 4 (enclosure or working area), and a controlled air extraction device 6, able to keep intervention zone 4 at a lower pressure than the exterior of this zone.

The system represented in the appended FIGURE also includes:

a monitoring device 8, to monitor the tritium concentration in the air of intervention zone 4, and a detection and signalling device 10, to detect the exceedance of a predefined threshold by this concentration, and to signal the exceedance to the person or persons present in intervention zone 4.

Controlled air extraction device 6 includes:

a filtration device 12, to filter any dust in the air which is extracted from intervention zone 4, an adjustment device 14, to adjust the flow rate of the air which is extracted, and a ventilation device 16.

In the example, device 12 is a high-performance dust-filtering device; adjustment device 14 is an adjustment damper, enabling the air flow rate to be adjusted according to the volume of zone 4 (for example, the volume of the enclosure), and according to the desired renewal of the air; and ventilation device 16 is an extraction turbine.

The system represented in the appended FIGURE also includes a device 18 for measuring the flow rate of the air which is extracted.

Monitoring device 8 includes a device for measuring the volume activity of the tritium, including:

an ionisation chamber 20 (flow-through ionisation chamber), and a device 22 to cause samples of the extracted air to flow, in ionisation chamber 20, at a flow rate which, in the example, is equal to at least 2.5 m$^3$ per hour.

Device 22 to cause the samples to flow in ionisation chamber 20 includes a first device 24 of the Venturi type to extract the samples, and a second device 26 of the Venturi type to restore the extracted samples.

Device 22 to cause the samples to flow also includes: an extraction turbine 28 to increase the flow of the samples in ionisation chamber 20, and a device 30 (a valve in the example) to adjust the flow rate of the extracted samples.

The inlet of ionisation chamber 20 is preferably fitted with a device (not represented) to heat the samples of air reaching it, notably in order to prevent disruptions of the measurements due to the presence of moisture in the air.

The system represented in the appended FIGURE also includes a device 32 for measuring the air flow rate in ionisation chamber 4.

The system represented in the appended FIGURE is fitted with an air extraction circuit which is constructed from flexible tubes 34, 36, 38 and 40. This circuit enables air to be extracted from zone 4 and to be conveyed in a ventilation pipe 42 (extraction network). Arrows 44 indicate the direction of flow of the air in the circuit.

As can be seen, this circuit is connected, on one side, to zone 4 through a device 46 for passage or connection of flexible tube 34, which is fitted to the removable confinement barrier and, on the other side, to pipe 42 through a sealed flange 48, which is fitted to this pipe.

In the circuit, starting at passage or connection device 46, filter 12, damper 14 and turbine 16 are found in succession. Tube 34 connects passage or connection device 46 to filter 12; tube 36 connects damper 14 to filter 12; tube 38 connects turbine 16 to damper 14; and tube 40 connects flange 48 to turbine 16.

In addition, flow rate measurement device 18 is installed on tube 36.

On the other hand, the device to cause samples 8 to flow includes in succession Venturi type device 24, valve 30, chamber 20, turbine 28, another control valve 50 and other Venturi type device 26.

These constituents of device 8 are connected to one another through pipes such as pipe 52. The flow direction of the extracted air samples is represented symbolically by arrows 54.

It can also be seen that devices 24 and 26 are "inserted" in flexible tube 40.

More specifically, flexible tube 40 consists of two portions, and the devices are installed in a metal sleeve 55, through which the two portions are connected to one another.

Thus, the air samples are extracted in tube 40, through device 24, and return to it through device 26.

In addition, flow rate measurement device 32 is installed in the pipe which connects chamber 20 to valve 30.

Detection and signalling device 10 includes electronic means 56 for processing the electrical current which is supplied by ionisation chamber 20, to determine the tritium concentration in the air. However, before processing the current is amplified by a preamplifier 58.

Indeed, this current which is due to the disintegration of tritium is weak, of the order of $10^{-15}$ A to $10^{-10}$ A, and must be amplified before being processed in means 56 (which are equipped with an amplifier (not represented)).

Device 10 is equipped with signalling means 60. These means 60 are placed in intervention zone 4 and are designed to inform, by an acoustic and visual signal, the operator or operators working in this zone, when the tritium concentration in the air of zone 4 exceeds a predefined value.

In what follows clarifications are given concerning the various constituents of the system represented in the appended FIGURE.

Let us firstly return to independent ventilator (turbine) 16, which is associated with filtration device 12.

Suction, through flexible tubes upstream from this ventilator, enables the tritium sources to be collected as close as possible to them, even in completely isolated zones. The suction flow rate may be adjusted by means of damper 14.

Purely as an indication, and in no way restrictively, a ventilator having the following characteristics is used: 2760 revolutions per minute-3 A-0.18 kW-13 kg-two speeds; and the flow rate is equal to 700 m³ per hour.

In practice, to prevent the accumulation of tritium in the working area, and to provide a low-pressure gradient favourable to the non-dissemination of radioactive substances, the value for hourly renewal of air in zone 4, for the dynamic confinement function, varies between 10 and 15 (10 to 15 renewals of the air of the zone per hour).

A value equal to 15 is chosen for the zones where tritiated liquids are present.

The ventilator therefore enables coverage of a volume of up to 50 m³.

Flow rate measuring device 18 is a hot wire sensor. It is associated with an indicator on which the results of the measurements are reported and flow rate thresholds are indicated.

Purely as an indication, and in no way restrictively, this sensor is a thermal sensor with a nickel resistor; it is 120 mm in length; the rod contained in this sensor is of a diameter equal to 10 mm; the sensor's measuring span is from 0.2 m/s to 200 m/s; the sensor's measuring range is from 0 m³/h to 700 m³/h; and the sensor has an analog output which ranges from 4 mA to 20 mA.

Filtration device 12 enables the prevention of dissemination outside the intervention zone of dust generated during the intervention (for example due to cutting or resuspension actions), and which is potentially very contaminated.

Purely as an indication, and in no way restrictively, filtration device 12 includes four paper and glass fibre filters in a box; its uranine efficiency is over 99.98%; nominal delta P of this filter is equal to 250 m³/h/Pa; and the maximum temperature tolerated by the filter is equal to 200° C.

Downstream from ventilator 16, metal sleeve 55, fitted with extraction and discharge devices of the Venturi type 24 and 26 provides a pressure difference required for the flow of the air and of the tritium in measuring device 8 which is fitted with ionisation chamber 20.

The connections between the different constituents of the ventilation chain are provided by the flexible tubes mentioned above.

Purely as an indication, and in no way restrictively, SEMA tubes, made from 0.6 mm thick PVC-coated polyester are used; they are reinforced by copper-plated steel turns supplied by the company ISOTEC.

Clarifications are now given concerning the tritium measuring and detection chain.

In the example, ionisation chamber 20 is of the GCC 80 EVP type and has a useful volume of 10 liters.

A $\beta^-$ particle is emitted when tritium disintegrates. This particle transfers its energy to the ambient environment, creating ion-electron pairs in it. The ions and the electrons are collected on two electrodes (not represented) contained in chamber 20 (measuring chamber) where a 300 V polarisation voltage has been established. A current is thus generated the value I of which is directly proportional to the tritium volume concentration.

Since the tritium oxide (HTO) form is the more disadvantageous in terms of dosimetry (it is more contaminating than the HT form for an operator) we take this form as the operational value. In other words, the calculations are made with this HTO form.

Current I is given by the following formula:

$$I = C \times V \times 10^{-3} \times E \times \frac{1}{W} \times 1,6 \times 10^{-19}$$

In this formula I represents the value of the ionisation current, expressed in amperes, and C is the tritium concentration in air, expressed in Bq·m⁻³.

However, in accordance with general radio protection rules of the Atomic Energy Commission, operational limits are now expressed in a unit which is noted $RCA_{tritiated\ water}$.

For a given radionuclide, an RCA corresponds to the average activity concentration, in Bq·m⁻³, which leads to an effective committed dose of 25 µSv in one hour's presence. And 1 $RCA_{tritiated\ water}$ is equal to 7.72×10⁵ Bq·m⁻³.

In addition, in the formula:

V represents the volume of the ionisation chamber, expressed in dm³;

E represents the average energy of the $\beta^-$ spectrum of tritium; it is expressed in eV and is equal to 5.7×10³ eV;

W represents the energy which is required to form a pair of ions in air; it is expressed in eV and is equal to 33.7 eV;

1.6×10¹⁹ represents the charge of the electron, expressed in coulombs.

The current in question is weak. It is amplified using preamplifier 58. The latter is associated with an amplifier to convert this current into a tritium volume activity value (in Bq/m³).

Preamplifier 58 is directly installed in chamber 20 (detector) and provides:

a calculation of the ionisation voltage, acquisition and digitisation of the ionisation current, and communication with the measuring resources (device 10).

The amplifier (not represented) is a DT137T amplifier in the described example. It allows local display of the measured value (value of I, converted into RCA) and processing of it:

to inform the users whenever a configurable threshold is exceeded, and to calculate totals by integration.

The main characteristics of this amplifier are as follows:

operating temperature: −10° C. to 40° C.;

electrical power: 220 V-50 Hz-100 W;

measuring span: $10^{-1}$ LPCA to $10^{11}$ LPCA (LPCA: limit for admissible concentration);

choice of volume activity units: RCA, LDCA, LPCA, CMA, Ci/m³, Bq/m³ (RCA: atmospheric concentration benchmark; LDCA: admissible concentration limit; CMA: authorised maximum concentration);

choice of activity units: Ci, Bq;

local indication using an LCD graphical display −240×64 points;

four-key sealed membrane keypad;
analog outputs: 0/10 VDC;
digital input/output: RS232C;
threshold exceedance alarms: a 5 A/250 V changeover contact;
state fault alarm: a 5 A/250 V changeover contact;
accuracy: ±0.3% of the measurement;
sensitivity: 0.002 LPCA;
stability: ±0.1% of the measurement;
repeatability: ±+0.1% of the measurement; and
response time: less than 10 s for 100% variation.

In device 10 a digital recorder (not represented) enables the volume activity values generated by the DT137T amplifier to be archived. The extraction flow rate values are also recorded and, after integration, enable the outcome of the intervention to be recorded in terms of discharges, and also the dosimetric outcome.

This recorder is fitted with removable USB storage devices, and allows recording over 320 days.

Turbine 28 allows the contaminated air to flow in the ionisation chamber, in addition to the pressure difference created by the previously described Venturi type device.

The flow rate of the air traversing the ionisation chamber is adjusted by valve 30, to which valve 50 is added in the example.

This flow rate is greater than or equal to 2.5 $m^3/h$. It is continuously controlled by device 32 which, in the example, is a hot wire sensor with an alarm.

Purely as an indication, and in no way restrictively, this sensor has the following characteristics:
it includes a nickel resistor;
it is 120 mm in length;
is measuring span is 0.2 m/s to 200 m/s;
the rod which it includes is 10 mm in diameter;
its measuring range is from 0 $m^3/h$ to 50 $m^3/h$; and
it has an analog output ranging from 4 mA to 20 mA.

Means 60 allow signalling which is positioned remotely in the working area. They include a flash bulb and a buzzer, giving a signal which is both acoustic and visual.

If a threshold is exceeded the operators are thus immediately informed of the risk of contamination in the place of the operation. They can then take all necessary measures to safeguard themselves, and do so extremely rapidly.

The system described enables three modules to be associated, which can be deployed independently of one another in the location of the intervention during which there is a risk of contamination by tritium.

Indeed, it enables the risk of contamination by tritium (by inhalation or by percutaneous transfer) to be prevented, by encouraging dilution in air and evacuation of the tritium.

It also allows rapid detection of a rise in contamination by tritium as close as possible to the discharge point, thus enabling the operators to safeguard themselves.

In addition, the type of signalling used enables the operators to be alerted in all circumstances (noise, sparks, projections).

Due to its modularity and the choice of elements comprising it, the system can be adapted to many circumstances, with a high degree of safety:
variable volumes,
confined intervention zone,
ease of connection (electrical and ventilation),
compliance with principle of non-dissemination, and
intrinsically safe system, with detections associated with the system's different functions.

In the invention there is consistency between the different facilities used, notably through the reproduction, with a removable system, of conditions of safety equivalent to those of fixed devices of an installation where tritium is found (dynamic confinement, monitoring and detection, information provided to agents).

After the interventions a complete assessment can be produced with regard to the quantity of tritium involved and the changes in the tritium concentration in the air. Knowledge-building can also be accomplished from dosimetric feedback.

In the example described the signalling is acoustic and visual, but in other examples it could be acoustic or visual.

In addition, the given example concerns interventions in a tritium atmosphere. But it can be suitable for interventions in any radioactive gas atmosphere.

The invention claimed is:

1. A system for intervention in an atmosphere of radioactive gas, notably tritium, where this system includes:
    a dynamic confinement device, including:
        a removable confinement barrier, able to surround an intervention zone, and
        a controlled air extraction device, able to keep intervention zone at a lower pressure than the exterior of this zone,
    and also including:
        a monitoring device, to monitor the radioactive gas concentration in the air of the intervention zone, and
        a detection and signalling device, to detect the exceedance of a predefined threshold by this concentration, and to signal the exceedance to the person or persons present in the intervention zone,
    in which the monitoring device includes a device for measuring the volume activity of the radioactive gas, and
    the device for measuring the volume activity of the radioactive gas includes:
        an ionisation chamber, and
        a device to cause samples of the extracted air to flow in the ionisation chamber.

2. A system according to claim 1, in which the controlled air extraction device includes:
    a filtration device, to filter any dust in the air which is extracted from the intervention zone,
    an adjustment device, to adjust the flow rate of the air which is extracted, and
    a ventilation device.

3. A system according to claim 2, also including a device for measuring the flow rate of the air which is extracted.

4. A system according to claim 1, in which the device to cause the samples to flow in the ionisation chamber includes:
    a first device of the Venturi type to extract the samples, and
    a second device of the Venturi type to restore the extracted samples.

5. A system according to claim 4, in which the device to cause the samples to flow also includes:
    a turbine to increase the flow of the samples in the ionisation chamber, and
    a device to adjust the flow rate of the extracted samples.

6. A system according to claim 1, also including a device for measuring the air flow rate in the ionisation chamber to monitor continuously the validity of the measurement of the volume activity of the radioactive gas.

7. A system according to claim 1, in which the detection and signalling device includes means to determine the radioactive gas concentration over time.

* * * * *